S. MORRIS.
SUPPORT AND HOUSING FOR ELECTRIC SWITCH MOUNTING.
APPLICATION FILED JULY 23, 1909.
1,035,380.
Patented Aug. 13, 1912.
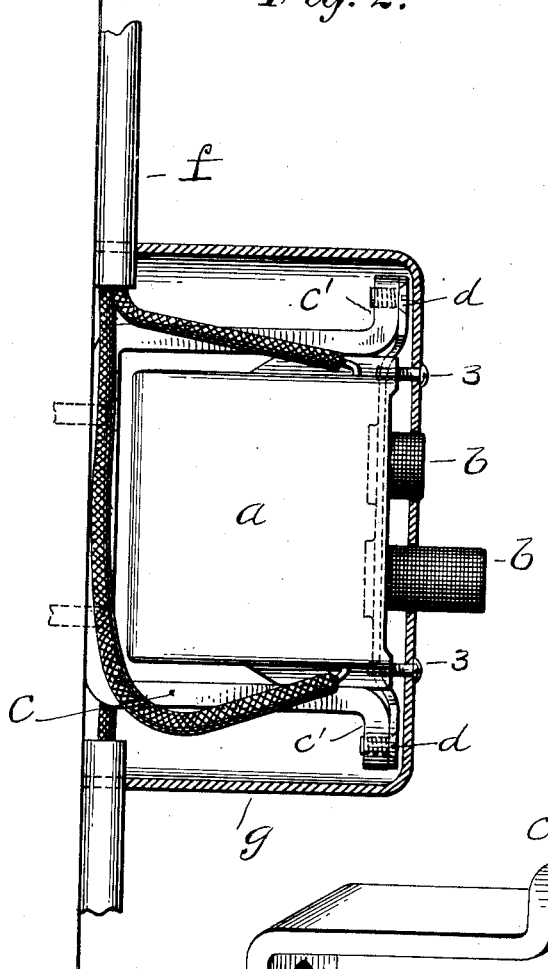
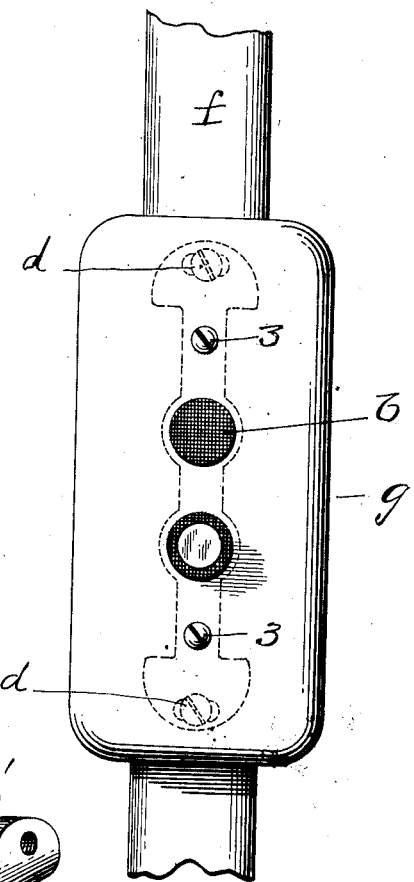
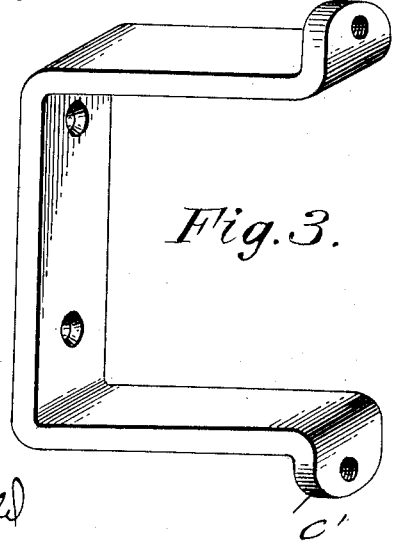
WITNESSES:
INVENTOR.
Shiras Morris
BY
ATTORNEY.

UNITED STATES PATENT OFFICE.

SHIRAS MORRIS, OF HARTFORD, CONNECTICUT, ASSIGNOR TO THE HART & HEGEMAN MANUFACTURING COMPANY, OF HARTFORD, CONNECTICUT, A CORPORATION OF CONNECTICUT.

SUPPORT AND HOUSING FOR ELECTRIC-SWITCH MOUNTING.

1,035,380. Specification of Letters Patent. Patented Aug. 13, 1912.

Application filed July 23, 1909. Serial No. 509,182.

*To all whom it may concern:*

Be it known that I, SHIRAS MORRIS, a citizen of the United States, and a resident of Hartford, in the county of Hartford and State of Connecticut, have invented certain new and useful Improvements in Supports and Housings for Electric-Switch Mountings, of which the following is a specification.

The object of the invention is to provide a novel method of mounting an electric switch.

My invention relates particularly to a device for mounting a flush switch on the face of a wall. It often happens that the wires leading to a switch are run through conduits which are secured to the face of the wall and by my invention I have provided a means for mounting a switch in place and suitably covering it to protect it and to cover the ends of the conduits.

In the drawings—Figure 1 is a plan view of a device embodying my invention. Fig. 2 is a side elevation of the housing in section. Fig. 3 is a detail view of the supporting strap.

Referring to the drawings $a$ denotes the ordinary switch receptacle containing any desired form of switch mechanism, a push button switch being shown in the drawings and the push buttons indicated at $b$.

$c$ is a U-shaped supporting member secured to the base and having laterally extending lugs $c'$ at the outer ends of its arms to which the switch is secured by screws $d$ which pass through the holding plate $e$ of the switch and into these laterally extending lugs $c'$. The length of the arms of this U-shaped supporting member is such as to allow for variations in the size of the porcelain receptacle. It is understood that this supporting member is located adjacent to the end of the conduit $f$ so that the wires can be carried directly to the switch contacts.

$g$ is a cover fitting down over the switch and supporting member having an aperture through its top for the switch-operating handle, in the case shown there being two countersunk holes for the push buttons. This box is secured to the supporting member or to the holding plate as by the screws 3—3 and its lower edge fits against the wall and is recessed as at 4 to fit over the conduit.

In this manner I provide a very simple and inexpensive structure which permits of mounting a flush switch on the face of a wall, providing the device with a box-like or cup-shaped cover which entirely incloses and protects the switch but which can be readily removed in order to permit of easily wiring the switch.

I claim :—

1. A switch mounting comprising a U-shaped supporting member adapted to be secured to the face of a wall with its arms outstanding therefrom, a switch supported at the ends of said arms, and a box-like cover supported by and inclosing said switch and supporting member.

2. A switch mounting comprising a U-shaped supporting member secured to the face of a wall with its arms outstanding therefrom, a switch located between said arms and supported from the outer ends thereof, a box-like cover fitting over said switch and supporting member with its edge lying against the face of the wall, said cover being secured to and supported from said supporting member.

SHIRAS MORRIS.

Witnesses:
A. E. PARSONS,
ALICE M. CORNWALL.